United States Patent [19]

Sacco et al.

[11] Patent Number: 5,553,909
[45] Date of Patent: Sep. 10, 1996

[54] SMALL TWO-SEATER CAR

[75] Inventors: Bruno Sacco; Johann Tomforde, both of Sindelfingen; Anton Reichel, Ditzinger, all of Germany; Gerhard Steinle, New Port Beach, Calif.; Berthold Klein, Rutesheim, Germany; David Slaughter, San Diego; Mike Ma, Rosemead, both of Calif.

[73] Assignee: Mercedes-Benz AG, Stuttgart, Germany

[21] Appl. No.: 399,359

[22] Filed: Feb. 28, 1995

[30] Foreign Application Priority Data

Feb. 28, 1994 [DE] Germany ................. 440648.9

[51] Int. Cl.⁶ .................................................. B60N 2/00
[52] U.S. Cl. ............... 296/185; 296/64; 296/70; 296/37.12; 296/204; 296/195
[58] Field of Search ................. 296/64, 70, 37.12, 296/204, 209, 185, 146.8, 195; 280/752, 784

[56] References Cited

U.S. PATENT DOCUMENTS

| | | | |
|---|---|---|---|
| 1,078,602 | 11/1913 | Morgan | 296/64 |
| 1,372,148 | 3/1921 | Lancia | 296/64 |
| 3,171,669 | 3/1965 | Berenyi | 280/784 |
| 4,552,399 | 11/1985 | Atarashi | 296/37.12 |
| 5,116,097 | 5/1992 | Bulgari | 296/64 |
| 5,201,547 | 4/1993 | Ogawa et al. | 296/195 |

FOREIGN PATENT DOCUMENTS

| | | | |
|---|---|---|---|
| 0547583A1 | 6/1993 | European Pat. Off. | |
| 1932073 | 1/1971 | Germany | 296/195 |
| 9312073 U | 12/1993 | Germany | |
| 321242 | 9/1934 | Italy | 296/64 |
| 110379 | 6/1983 | Japan | 296/185 |
| 8163 | 1/1985 | Japan | 280/784 |
| 164681 | 6/1989 | Japan | 296/204 |
| 20719 | of 1914 | United Kingdom | 296/37.12 |
| 841237 | 7/1960 | United Kingdom | |
| 1187883 | 4/1970 | United Kingdom | |
| 2128562 | 5/1984 | United Kingdom | |

OTHER PUBLICATIONS

Lamm, John, "The Honda City", Road & Track, vol. 33, No. 9.

Primary Examiner—Gary C. Hoge
Attorney, Agent, or Firm—Evenson, McKeown, Edwards & Lenahan

[57] ABSTRACT

A small two-seater car, which has a driver seat and a passenger seat disposed laterally adjacent one another and in facing relationship to an asymmetric dashboard. The passenger seat is arranged to be longitudinally offset to the rear with respect to the driver seat located beside it, by up to half the depth of a seat cushion. The dashboard arranged in front of the seats extends back with its side which is directed towards the seat in its passenger-side region to such an extent that the distance between the dashboard and the seat front edge is approximately the same for the driver seat and the passenger seat. In the region of a rear axle, outer frame side members extend, in a bent-off section, up to at least the level of a tire upper edge, such that at least the passenger seat is protected with respect to side impact forces. The bodywork of the vehicle has virtually no overhang beyond the rear wheels, with the result that, in the event of a rear impact, the rear axle is used to absorb impact forces before more pronounced intrusion to the rear takes place.

11 Claims, 1 Drawing Sheet

// 1

SMALL TWO-SEATER CAR

BACKGROUND AND SUMMARY OF THE INVENTION

Up until now, small vehicles have had either very poor characteristics in terms of crash behavior for the front, rear and sides of the vehicle, along with a simultaneously constricted feeling for the occupants, or else larger outer dimensions with the same small interior and thus a poor space-utilization coefficient without the advantages of a considerable reduction in surface area.

An object of the present invention is thus to present a design for a small two-seater car, which, with a minimal surface-area requirement, is intended to offer the greatest possible degree of safety to the occupants, without greater outlay in terms of structure and weight-increasing materials.

This object is achieved according to the invention by a combination of the following features:

a) the passenger seat is arranged to be longitudinally offset to the rear, by up to half the depth of a seat cushion, with respect to the driver's seat located beside it;

b) a dashboard arranged in front of the seats extends back, with its side which is directed towards the seats, in its passenger-rider region to such an extent that the distance between the dashboard and seat front edge is approximately the same for both the driver's seat and the passenger seat;

c) outer frame side members extend in a bent-off section in the region of the rear axle, up to at least the level of the tire upper edge, such that at least the passenger seat is protected with respect to side impact forces; and d) the bodywork of the vehicle has virtually no overhang beyond the rear wheels, with the result that, in the event of a rear impact, the rear axle is used to absorb impact forces before more pronounced intrusion to the rear takes place.

Feature a) makes it possible that, by virtue of the driver/passenger seat arrangement which is longitudinally offset by up to half the depth of a seat cushion, the seats can move nearer to the center of the vehicle without the occupants sitting shoulder to shoulder, that the occupants are given a considerably greater sense of space and the driver has a considerably better all-round view, and that, despite the small width of the bodywork, a greater distance between the occupants and the outer edge of the vehicle is achieved, this being important both from safety aspects and psychologically. In preferred embodiments, the in use position of the passenger seat is configured to be between 10 cm and 30 cm (preferably about 20 cm) to the rear of the in use position of the driver's seat. In especially preferred embodiments, the seats are longitudinally adjustable to accommodate different size passengers and the like. The basic design concept is to maintain the two seats offset longitudinally from one another during normal driving operations.

Feature b) achieves the fact that, despite the seat arrangement according to feature a), the distance between the passenger seat and the dashboard remains largely the same or, at most, differs only to the extent that, here too, a passenger airbag with a normal filling volume can be used. In preferred embodiments, the rearward protrusion of the dashboard on the passenger side, as compared to the driver's side, corresponds substantially to the longitudinal offset of the seats.

In conjunction with feature a), feature c) makes it possible for frame side members, which are necessary in any case, to provide effective side-impact protection in the region of the rearwardly offset passenger seat, without any further structural outlay.

Finally, feature d) makes possible—likewise without extra weight-increasing outlay—effective protection of the vehicle occupants in the event of a rear impact, this being aided further by the special arrangement of a frame cross-member, which is necessary in any case.

Other objects, advantages and novel features of the present invention will become apparent from the following detailed description of the invention when considered in conjunction with the accompanying drawings.

DETAILED DESCRIPTION OF THE DRAWINGS

Figure 1:
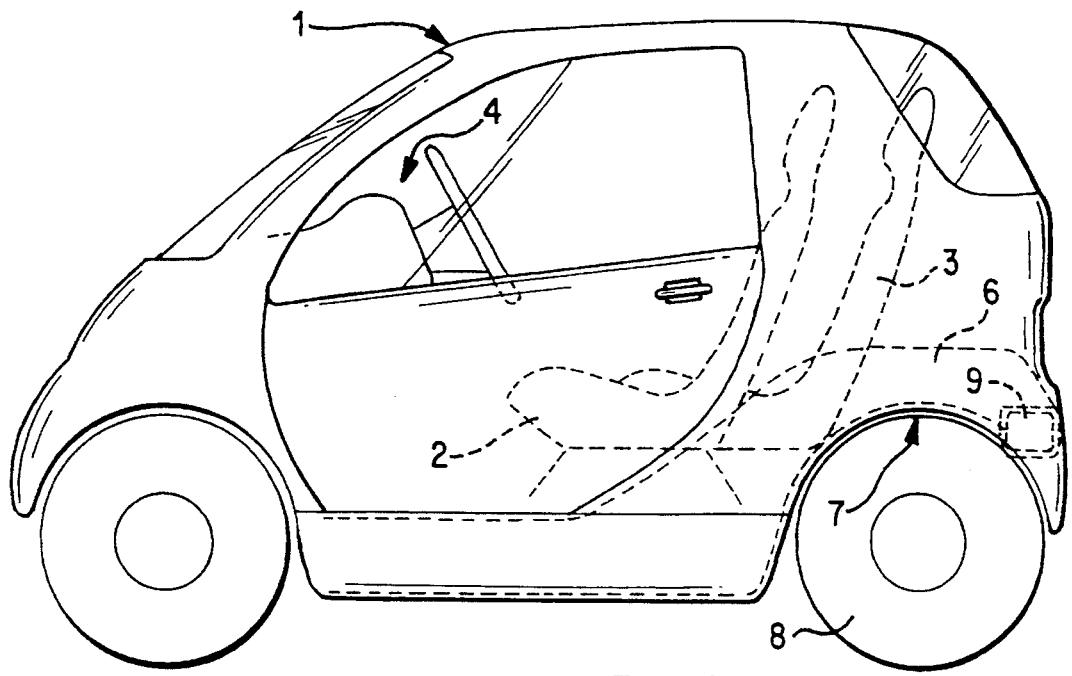
FIG. 1 is a schematic side view of a small car constructed according to the invention.
Figure 2:
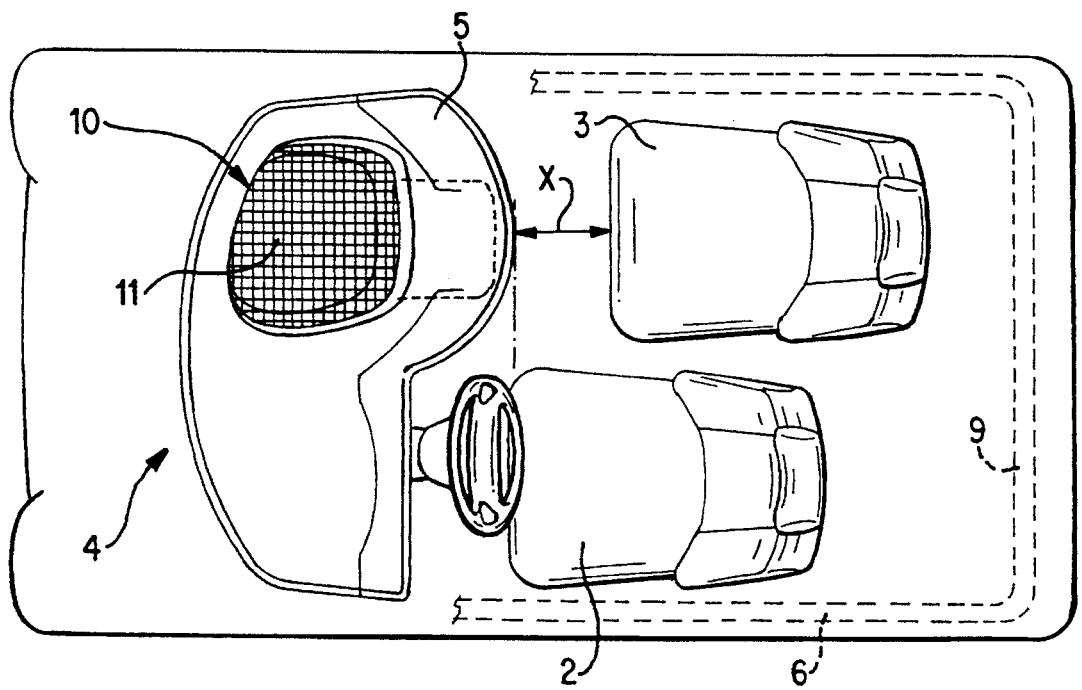
FIG. 2 is a schematic plan view of the vehicle of FIG. 1.

The small car represented schematically in the drawing has a driver's seat 2 and a passenger seat 3, the passenger seat 3 being arranged to be longitudinally offset (distance X in FIG. 2) to the rear, by approximately half the depth of a seat cushion with respect to the driver's seat 2. Approximately corresponding to this longitudinal offset, a dashboard 4 arranged in front of the seats also extends back in its passenger-side region 5 by distance X, as compared to the dashboard section in front of the driver seat 2. Due to this asymmetric design of the dashboard 4 with the offset X to the passenger seat 3, it is possible to use an airbag of normal size in front of the passenger seat.

In order to provide effective side-impact protection, in particular for the passenger seat 3, outer frame side members 6 extend in the region of the rear axle, in a bent-off section, up to at least the level of the tire upper edge 7, with the result that the lower part of the passenger seat 3 is virtually "sheltered" by the frame side members 6.

In order to prevent pronounced intrusion to the rear in the event of an accident, provision is made for two measures.

On the one hand, the bodywork of the vehicle 1 has virtually no overhang beyond the rear wheels 8, with the result that,in the event of a rear impact, the rear axle is used directly to absorb the impact.

On the other hand, arranged approximately level with the top of the rear wheels 8 is a rigid frame crossmember 9 which, with its rear edge, is approximately in alignment with the outer tire contour located therebeneath.

Finally, the passenger-side region 5 of the dashboard 4 is also of advantageous interest. There, the free space obtained by the special design of the region 5 is designed as a stowage space 10 which can be reached from above or below the dashboard and of which the bottom is formed by a stretched-over netting 11 which is arranged at a lower level than the top edge.

In preferred embodiments, the seats are both longitudinally adjustable to accommodate driver and passenger seating configuration preferences with the asymmetric dashboard configuratin as shown providing the above-described advantages of seat offset for usual driving condtions.

In preferred embodiments, the offset X is about 20 cm , corresponding to about ½ of the seat cushion length. Practical embodiments are contemplated where the offset X is more than 10 cm and preferably between 10 cm and 30 cm for usual in use driving conditions.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Small two-seater car, comprising:
   a) at least one front wheel and a pair of rear wheels, each wheel including a tire, and an axle extending between said rear wheels;
   b) a driver seat on a driver side of said car and a passenger seat on a passenger side of said car, each seat having a seat cushion thereon, and the passenger seat being longitudinally offset to the rear with respect to the driver seat located beside it, by up to half the depth of said seat cushion;
   c) a dashboard arranged in front of said driver seat and said passenger seat, wherein the dashboard extends a first distance rearwardly on the driver side and a second distance rearwardly on the passenger side, and wherein the second distance is greater than the first distance by an amount approximately equal to the amount of longitudinal offset of the passenger seat, such that the distance between the dashboard and a front edge of said driver seat is approximately the same as the distance between the dashboard and a front edge of said passenger seat;
   d) outer frame side members in the region of a said rear wheels which extend in a bent-off section up to at least the level of a rear wheel upper edge, such that at least the passenger seat is protected with respect to side impact forces by the outer frame side members; and
   e) vehicle bodywork having virtually no overhang beyond said rear wheels, whereby, in the event of a rear impact, said rear axle is used to absorb impact forces before more pronounced intrusion to the rear takes place.

2. Small car according to claim 1, wherein a rigid frame crossmember is arranged approximately level with the top of the rear wheels, a rear edge of the rigid frame crossmember being approximately in alignment with the rear edge of said rear wheels.

3. Small car according to claim 1, wherein a portion of the dashboard in front of the passenger seat includes a stowage space.

4. Small car according to claim 3, wherein the stowage space is accessible from above and a bottom thereof is formed by a stretched-over netting.

5. Small car according to claim 2, wherein a portion of the dashboard in front of the passenger seat includes a stowage space.

6. Small car according to claim 5, wherein the stowage space is accessible from above and a bottom thereof is formed by a stretched-over netting.

7. Small car according to claim 3, wherein the stowage space is accessible from above the dashboard.

8. Small car according to claim 3, wherein the stowage space is accessible from below the dashboard.

9. Small car according to claim 1, wherein the passenger seat is offset longitudinally to the rear with respect to the driver seat by between 10 cm and 30 cm.

10. Small car according to claim 9, wherein the passenger seat is offset longitudinally to the rear with respect to the driver seat by between 15 cm and 25 cm.

11. Small car according to claim 9, wherein the passenger seat is offset longitudinally to the rear with respect to the driver seat by about 20 cm.

* * * * *